US010523436B2

(12) United States Patent
Zhang et al.

(10) Patent No.: US 10,523,436 B2
(45) Date of Patent: Dec. 31, 2019

(54) SECURITY LOCKING DEVICE OF COMPUTERS

(71) Applicants: SHENZHEN ZHENHUA MICROELECTRONICS CO., LTD, Shenzhen (CN); CHINA ZHENHUA (GROUP) SCIENCE & TECHNOLOGY CO., LTD, Guiyang (CN)

(72) Inventors: Jianguo Zhang, Shenzhen (CN); Zilin Yi, Shenzhen (CN)

(73) Assignees: SHENZHEN ZHENHUA MICROELECTRONICS CO., LTD, Shenzhen (CN); CHINA ZHENHUA (GROUP) SCIENCE & TECHNOLOGY CO., LTD, Guiyang (CN)

( * ) Notice: Subject to any disclaimer, the term of this patent is extended or adjusted under 35 U.S.C. 154(b) by 363 days.

(21) Appl. No.: 15/520,838

(22) PCT Filed: Dec. 18, 2015

(86) PCT No.: PCT/CN2015/097959
§ 371 (c)(1),
(2) Date: Apr. 20, 2017

(87) PCT Pub. No.: WO2017/101122
PCT Pub. Date: Jun. 22, 2017

(65) Prior Publication Data
US 2017/0373851 A1 Dec. 28, 2017

(51) Int. Cl.
*H04L 9/30* (2006.01)
*G06F 21/62* (2013.01)
(Continued)

(52) U.S. Cl.
CPC ............ *H04L 9/3073* (2013.01); *G06F 21/62* (2013.01); *G06F 21/80* (2013.01); *G06F 21/575* (2013.01); *H04L 9/0844* (2013.01)

(58) Field of Classification Search
CPC ........ H04L 9/0844; G06F 21/31; G06F 21/575
(Continued)

(56) References Cited

U.S. PATENT DOCUMENTS 8,386,797 B1 2/2013 Danilak
2008/0177922 A1* 7/2008 Chow ................ G06F 11/2221
710/302
(Continued)

FOREIGN PATENT DOCUMENTS

CN 200990081 Y 12/2007
CN 101236532 A 8/2008
(Continued)

OTHER PUBLICATIONS

International Search Report for PCT/CN2015/097959.

*Primary Examiner* — Bryan F Wright

(57) ABSTRACT

The present disclosure relates to a security locking device of computers having separate key pairs, and including an encryption board inserted between a main board and a hard disk, and an encryption board being inserted into the encryption board to perform a real-time authentication process. The electronic key and the encryption board performs the real-time authentication process and hardware anti-copy self-testing process, and encrypt the data communicated between the encryption board and the electronic key. After passing the authentication process and the hardware anti-copy self-testing process, the electronic key combines an internally stored key list with the key list on the encryption board, and selects a user key to encrypt/decrypt the data on the disk according to the partition of the hard disk where the encrypted data is written to. The security locking device can assure the safety of the data, and the hardware is prevented from being copied.

9 Claims, 9 Drawing Sheets

(51) Int. Cl.
   *G06F 21/80* (2013.01)
   *H04L 9/08* (2006.01)
   *G06F 21/57* (2013.01)

(58) Field of Classification Search
   USPC .......................................................... 380/44
   See application file for complete search history.

(56) References Cited

U.S. PATENT DOCUMENTS

| | | | | |
|---|---|---|---|---|
| 2013/0318358 | A1* | 11/2013 | Wang ...................... | G06F 21/31 |
| | | | | 713/182 |
| 2014/0032910 | A1* | 1/2014 | Nagai ................... | H04L 9/0844 |
| | | | | 713/171 |
| 2016/0026468 | A1* | 1/2016 | Gueron ............... | G06F 9/30156 |
| | | | | 713/190 |
| 2016/0125187 | A1* | 5/2016 | Oxford ................. | G06F 21/575 |
| | | | | 713/2 |

FOREIGN PATENT DOCUMENTS

| | | | |
|---|---|---|---|
| CN | 101853220 | A | 10/2010 |
| CN | 104077243 | A | 10/2014 |
| CN | 104951409 | A | 9/2015 |

* cited by examiner

SECURITY LOCKING DEVICE OF COMPUTERS

BACKGROUND

1. Technical Field

The present disclosure generally relates to a security locking device of computers, and especially relates to a security locking device of computers having separate key pairs.

2. Description of Related Art

Currently, most of the information security products operate in a way similar to firewalls without protecting the information itself. That is, the stored information has not been encrypted and decrypted, and the encryptions are only conducted by configuring encryption devices at the information output interface. Nevertheless, the information leakage may occur due to inappropriate operations caused by misunderstanding or troublesome, such as the demolition of the encryption devices, or connecting the encryption devices by private lines.

SM4 is a cryptographic algorithm approved by the Chinese government for use in wireless networks. SM4 was formerly known as SMS4. The SM4 cryptographic algorithm is a block cipher algorithm. The input data (also referred to as state), output data, and cryptographic key are each 128-bits. Encryption of data is performed through thirty-two rounds. Each round involves a number of different operations or transformations that are used to transform the input data into the encrypted data. Thirty-two rounds with similar transformations are used to decrypt data. There are also thirty-two rounds for key expansion in which round keys for the different encryption and decryption rounds are generated. Further details of the SM4 cryptographic algorithm, if desired, are available in the document "SM4 Encryption Algorithm for Wireless Networks," translated and typeset by Whitfield Diffie of Sun Microsystems and George Ledin of Sonoma State University, 15 May 2008, Version 1.03. Thus, a newly developed encryption device is configured to encrypt the information itself, however, such product may be easily cloned and the operations are not so convenient.

SUMMARY

The present disclosure relates to a separate computer encryption lock for encrypting/decrypting stored information and to conduct real-time authentication to prevent the hardware from being copied.

In one aspect, a security locking device of computers having separate key pairs includes: an encryption board being arranged between a main board and a hard disk of the computer, and an electronic key being inserted into the encryption board to perform a real-time authentication process with the encryption board; after passing the authentication process, the encryption board encrypts or decrypts data communicated between the main board and the hard disk; an user key for encrypting the data between the main board and the hard disk is retrieved from a key list, the key list includes a first list stored within the encryption board and a second list stored within the electronic key, and the user key is selected from the key list according to a partition of the hard disk where the encrypted data is written to; during an authentication process, the encryption board collects a first unique identifier (A) relating to a hardware of the encryption board, and the electronic key collects a second unique identifier (B) relating to the hardware of the electronic key; the encryption board receives the second unique identifier (B) from the electronic key, and the second unique identifier (B) and the first unique identifier (A) combined into a third unique identifier of the encryption board (T1); the electronic key receives the first unique identifier (A) from the encryption board, and the first unique identifier (A) from the encryption board and the second unique identifier (B) combined into a fourth unique identifier of the electronic key (T2); the encryption board continuously generate a random number set X, encrypts the random number set X, encrypts the third unique identifier of the encryption board (T1), and performs logical operations to obtain the first authentication information "A", the encryption board continuously sends the random number set X to the electronic key, the electronic key encrypts the random number set X, encrypts the fourth unique identifier of the electronic key (T2), performs the logical operations to obtain the second authentication information "B", and sends the second authentication information "B" to the encryption board, and the second authentication information "B" is compared with the first authentication information "A" to finish the authentication process.

Wherein the encryption board includes: a first random number module configured to continuously generate at least one first random number; a second random number module configured to continuously generate at least one second random number; a first Field Programmable Gate Array (FPGA) unit configured to apply logical operations to internal data, to perform the authentication process to the electronic key, and to encrypt and decrypt the data between the main board and the hard disk; a first encryption module configured to encrypt the data transmitted from the first FPGA unit and to transmit the encrypted data back to the first FPGA unit; a single-chip microcontroller communicates with the electronic key; the first FPGA unit receives a first random number and a second random number, and performs the logical operations on the first random number and the second random number to obtain the random number Z, the random number set X {X1, X2, X3, X4, . . . , Xn}, and a device key Y, wherein the random number set X changes along with time, the first FPGA unit transmits the device key Y to the electronic key via the single-chip microcontroller and the USB interface, the device key Y operates as an encryption key when the electronic key and the encryption board encrypt the random number set X, the third unique identifier of the encryption board (T1), and the fourth unique identifier of the electronic key (T2); the data communicated between the encryption board and the electronic key is the encrypted random number set X.

Wherein after being programmed, the first FPGA unit includes: a Serial Advanced Technology Attachment (SATA) host controller communicating with the hard disk; a SATA device controller communicating with the main board; a third encryption module configured between the hard disk and the main board for encrypting the data between the hard disk and the main board; a random number calculation module configured to perform the logical calculations for the first random number and the second random number so as to generate the random set X {X1, X2, X3, X4, . . . , Xn}; a first reception module configured to collect the second authentication information "B" from the electronic key and the second list; a first identifier collection module configured to collect and to send the first unique identifier (A) of the encryption board and to receive the second unique identifier (B) of the electronic key; a first authentication information generation module configured to receive the third unique identifier of the encryption board (T1) from the first identifier collection module and the random number set X so as to generate the first authentication information "A" for the encryption board; an authentication module compares the second authentication information "B" and the first authentication information "A" to determine whether the encryption board and the electronic key are matched; a first hardware anti-copy module being internally stored with a first pre-stored unique identifier (A1) of the encryption board, and the first pre-stored unique identifier (A1) is compared with the first unique identifier (A) to determine whether the hardware has been copied; and a first Universal Serial Bus (USB) random number control module communicating with the first encryption module.

Wherein the first FPGA unit further includes a user key control module stored with the key list, the user key is selected from the key list according to an indicator (T), and an initial value of the indicator (T) is the random number Z.

Wherein the first random number module and the first encryption module adopts a SM1 encryption algorithm, and the second random number module generates the random numbers of 1 bit every hour.

Wherein the first list stores high bits of the user keys, and the second list stores low bits of the user keys, or the first list stores the low bits of the user keys and the second list stores the high bits of the user keys, the first list and the second list are combined to the complete key list, and the user key selected from the complete key list is adopted to encrypt the data on the hard disk and the main board.

Wherein SM4 algorithm is adopted to generate the first authentication information "A" and the second authentication information "B" and to encrypt the data on the hard disk.

Wherein the electronic key includes: a second FPGA unit is configured to decrypt the data from the encryption board, perform the logical operations, encrypt the authentication information "B," and to send the encrypted information to the encryption board; a second encryption module is configured to receive the data from the second FPGA unit, encrypt the data, and send the encrypted data back to the second FPGA unit.

Wherein after being programmed, the second FPGA unit includes: a second reception module is configured to receive the data sent from the encryption board, and to send the data to the second encryption module; a second authentication information generation module is configured to generate the second authentication information "B"; a second identifier collection module is configured to collect and to transmit the second unique identifier (B) of the electronic key; a second hardware anti-copy module is configured to determine whether a hardware of the electronic key has been copied; and an authentication and key transmission module is configured to send the second authentication information "B" and the pre-stored key list to the encryption board.

Wherein the second hardware anti-copy module is pre-stored with the second pre-stored unique identifier (B1), and the second pre-stored unique identifier (B1) is compared with the second unique identifier (B) to determine whether the hardware of the electronic key has been copied.

The advantages of the security locking device of computers will be described hereinafter:

1. The data retrieve from or write to the hard disk is encrypted and decrypted, and thus are cyphertext, which assures the data security.

2. The data on the hard disk are encrypted by the user key determined by the partition where the data is written to, and thus the data stored in the same partitions may be encrypted by different keys, which assures the data security.

3. The user key adopted to encrypt the data on the hard disk is randomly selected from the key list. There is no similarity of the two different keys, and thus the data security may be enhanced.

4. The keys in the key lists are respectively stored in the first list and the second list of the encryption board, and thus the key list is prevented from being stolen.

5. The random number set X is generated in real time, and the electronic key and the encryption board respectively encrypts the random number set X to generate the second authentication information "B" and the first authentication information "A". The electronic key transmits the second authentication information "B" to the encryption board in a real-time manner to compare with the first authentication information "A" so as to finish the authentication process. The authentication process fails if the electronic key is removed, and the system halts.

6. The first authentication information "A" and the second authentication information "B" are obtained by performing the logical operations of the unique identifiers. When the unique identifier of the electronic key is different from the unique identifier of the encryption board, the first authentication information "A" and the second authentication information "B" are not matched. In this way, the hardware is prevented from being copied.

7. When the electronic key and the encryption board are manufactured, respective unique identifier are stored internally. During the operations, the unique identifiers of the hardware are collected, and are compared with the unique identifiers stored in the electronic key or the encryption board to prevent the hardware from being copied.

8. The security locking device of computers adopts SM4 algorithm to encrypt/decrypt the data, and the SM1 algorithm is adopted to encrypt/decrypt the random number and the authentication information. The speed of the SM1 algorithm is faster than that of the SM4 algorithm.

BRIEF DESCRIPTION OF THE DRAWINGS

Many aspects of the present embodiments can be better understood with reference to the following drawings. In conjunction with the accompanying drawings, the technical solutions and advantages of the present disclosure will be illustrated by the detailed descriptions of the embodiments.

DETAILED DESCRIPTION

Embodiments of the invention will now be described more fully hereinafter with reference to the accompanying drawings, in which embodiments of the invention are shown.

Figure 1:
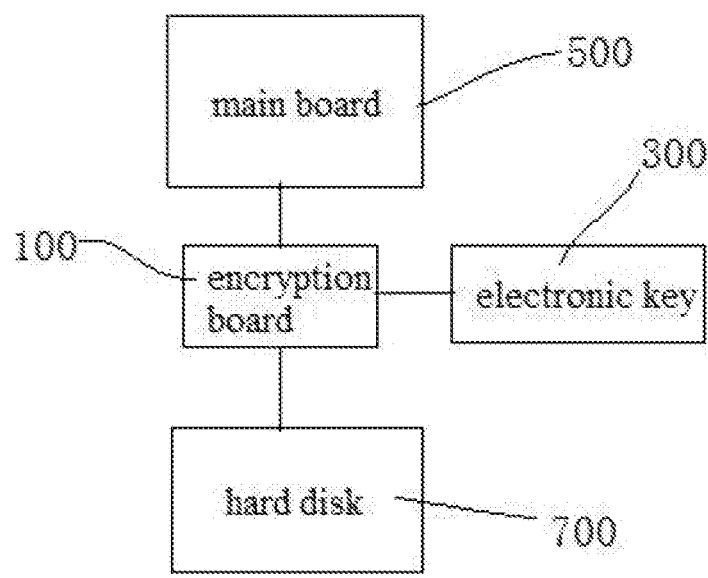
FIG. 1 is a schematic view of the security locking device of computers in accordance with one embodiment.

Referring to FIG. 1, the security locking device of computers includes an encryption board 100 being inserted between a main board and a hard disk 700, and an electronic key 300 being inserted into the encryption board 100 to cooperatively perform authentication with the electronic key 300.

In the present disclosure, after the electronic key 300 is inserted into the encryption board 100, the encryption board 100 and the electronic key 300 respectively perform self-testing processes with respect to its hardware. After the self-testing process is completed, a hardware matching testing is applied to the electronic key 300 and the encryption board 100 to perform real-time authentication. Afterward, the encryption board 100 begins to encrypt or decrypt the information on the main board and the hard disk 700, wherein the self-testing process relates to testing whether the hardware has been copied so as to increase the safety.

In the embodiment, the operation principle of the security locking device of computers includes three phases, which are respectively a data encryption phase, an authentication phase, and a hardware anti-copy phase.

The hardware structure will be described first, and the operational principles will be described afterward.

Figure 2:
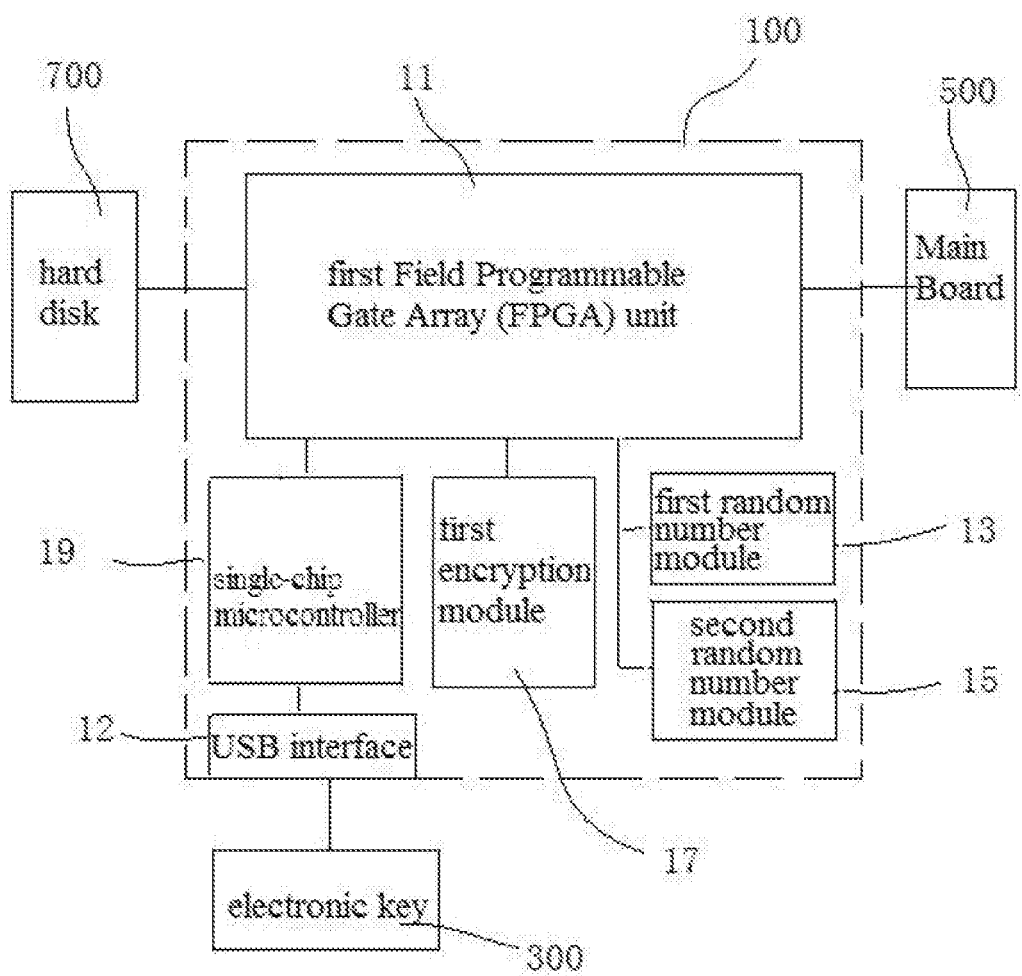
FIG. 2 is a schematic view of the encryption board in accordance with one embodiment.

Referring to FIG. 2, the encryption board 100 includes a first Field Programmable Gate Array (FPGA) unit 11, a first random number module 13, a second random number module 15, a first encryption module 17, and a single-chip microcontroller 19, wherein the first random number module 13, the second random number module 15, the first encryption module 17, and the single-chip microcontroller 19 are connected with the first FPGA unit 11. The single-chip microcontroller 19 connects with an USB interface 12, and communicates with an electronic key 300 via the USB interface 12.

The first FPGA unit 11 is configured to apply at least one logical operation to internal data, to perform an authentication process to the electronic key 300, and to encrypt and decrypt data between the main board and the hard disk 700.

The first encryption module 17 is configured to encrypt the data transmitted from the first FPGA unit 11 and to transmit the encrypted data back to the first FPGA unit 11.

In the embodiment, the first random number module 13 continuously generates at least one first random number, and the second random number module 15 continuously generates at least one second random number, wherein the first random number and the second random number are random number of 32 bits. The first random number module 13 may include a first security chip for performing encryption algorithms, including, but not limited to, SM1, SM2, SM3, SM4, 3DES, and RSA. In an example, the first security chip may be SSX1019, and the second random number module 15 may include a second security chip for generating the random number of 1 bit every hour. In an example, the second security chip may be WNG9 chip.

The first random number module 13 and the second random number module 15 are mainly configured to generate the random numbers and to perform the self-testing process toward the hardware by the random numbers. The two modules operate independently, and auxiliary circuits are configured in a rim of the first random number module 13 and the second random number module 15. The second random number module 15 also includes a 32 bits shift register, wherein the WNG9 generates the random number of 1 bit every hour, and the generated random number is stored within the shift register. The shift register outputs one random number of 32 bits upon determining the shift register is full.

Figure 3:
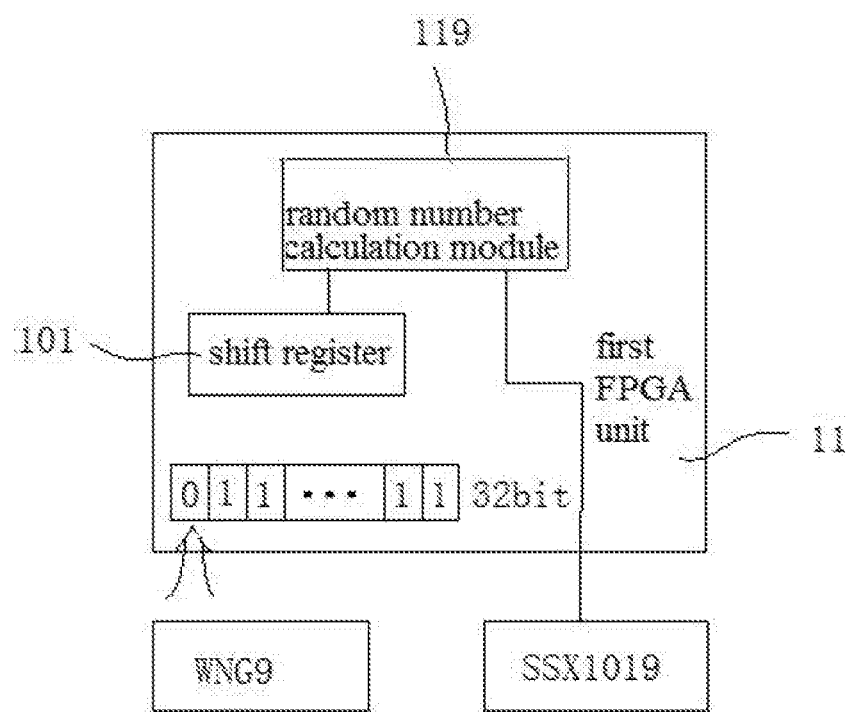
FIG. 3 is a schematic view of random numbers generated by a register in accordance with one embodiment.

In one embodiment, the shift register 101 is implemented by programming the software within the first FPGA unit 11, and the block diagram of the shift register 101 is shown as in FIG. 3.

In one embodiment, the first encryption module includes an encryption chip supporting SM1 encryption algorithm. In an example, the chip may be SSX1010. The chip performs SM1 algorithm to encrypt the random number received from the first FPGA unit 11 and transmits the encrypted random number back to the first FPGA unit 11. In the embodiment, the single-chip microcontroller 19 is configured to control the communications between the electronic key 300 and the USB interface 12.

Figure 4:
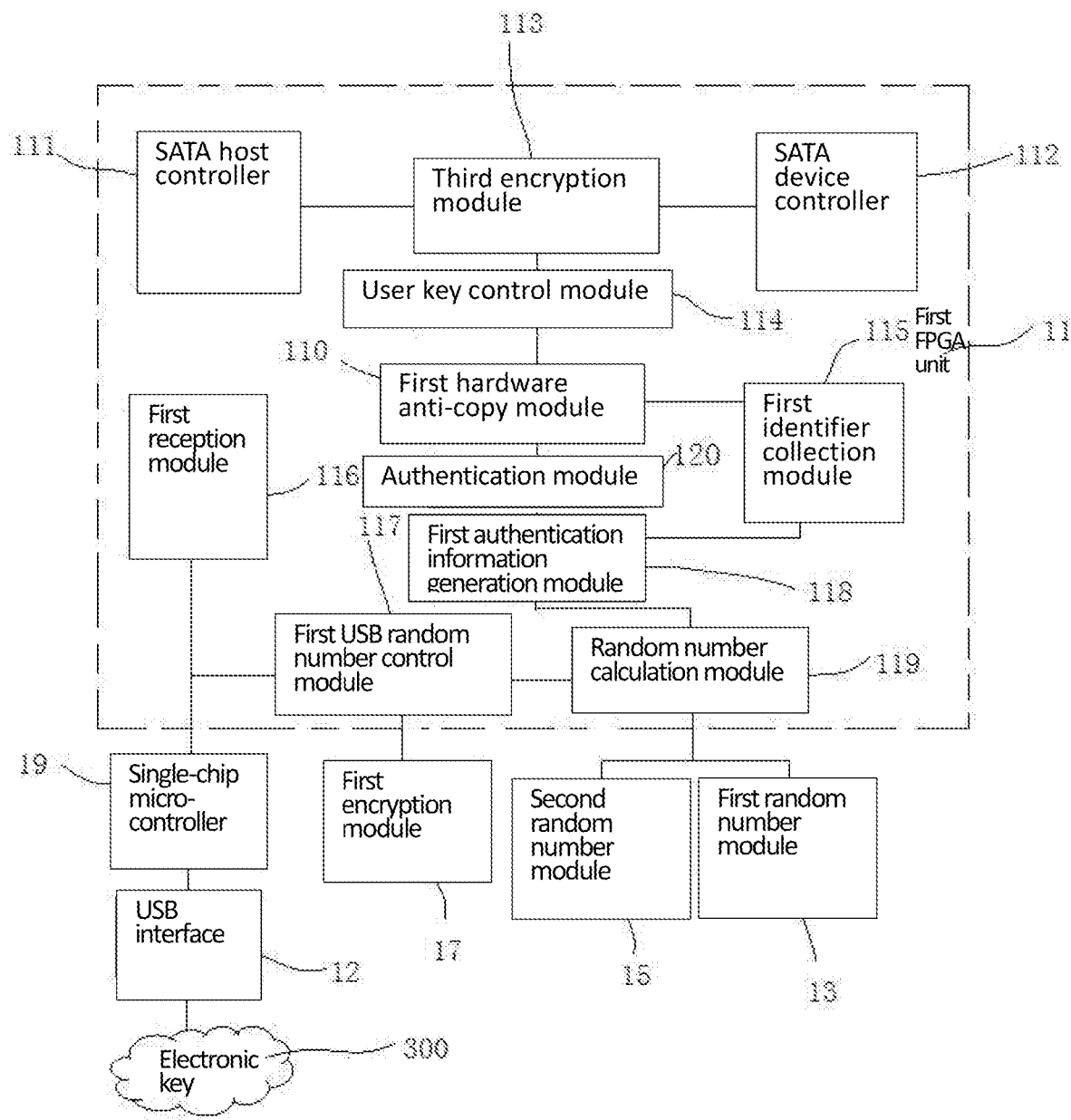
FIG. 4 is a block diagram of the encryption board in accordance with one embodiment.

Further, when the software within the first FPGA unit 11 is programmed, a plurality of circuits are configured as shown in FIG. 4. The first FPGA unit 11 includes a SATA host controller 111, a SATA device controller 112, a third encryption module 113, a random number calculation module 119, a first reception module 116, a first identifier collection module 115, a first authentication information generation module 118, an authentication module 120, a first hardware anti-copy module 110, and a first USB random number control module 117.

The third encryption module 113 is configured between the hard disk and the main board for encrypting the data between the hard disk and the main board.

The random number calculation module 119 is configured to perform the logical calculations for the first random number and the second random number so as to generate a random set X {X1, X2, X3, X4, . . . , Xn}, a random number Z, and a device key Y, wherein the random set X {X1, X2, X3, X4, . . . , Xn} are electronic keys and the plaintext of the encrypted data transmitted when the encryption board performs the authentication process. To prevent the data from being cracked during the transmission from the encryption board and the electronic key, the data are encrypted by the random number set X by adopting the SM1 algorithm. The device key Y is the encryption key of the random number set X for performing the hardware anti-copy self-testing process and the real-time authentication process. The third encryption module 113 encrypts the data one the hard disk and the main board using the user key, and the user key is determined by the random number Z.

The first reception module 116 is configured to collect authentication information B from the electronic key.

The first identifier collection module 115 is configured to collect and to send a first unique identifier (A) relating to the encryption board and the hardware, to receive a second unique identifier (B) collected by the electronic key, and to generate an encryption board identifier (T1). The identifier (B) is directed to the hardware.

The first authentication information generation module 118 is configured to receive the encryption board identifier (T1) from the first identifier collection module 115 and the random number (X) so as to generate the first authentication information "A" for the encryption board.

The authentication module 120 is stored with the unique identifier (A1), which is the same with the first unique identifier (A) of the hardware address of electronic devices. and stored with unique identifier (B), which is the same with the hardware address of the electronic key. The authentication module 120 compares the second unique identifier (B) and the second pre-stored unique identifier (B1) to determine whether the encryption board and the electronic key are hardware matched.

The first hardware anti-copy module 110 is stored with the unique identifier (A1) of the encryption board, and the unique identifier (A1) is compared with the first unique identifier (A) to determine whether the hardware has been copied. The unique identifier (A1) is directed to the identifier (ID) identical to the first unique identifier (A) of the first FPGA unit 11 when the hardware is manufactured, and the unique identifier (A1) is manually programmed within the first FPGA unit 11. Similarly, the second pre-stored unique identifier (B1) is generated in a way similar to the unique identifier (A1). After the hardware is electrified, the first identifier collection module 115 collects the first unique identifier (A) of the hardware and compares the first unique identifier (A) with the unique identifier (A1). If the hardware of the first FPGA unit 11 has not been copied, the collected unique identifier (A) and the stored unique identifier (A1) are the same. Otherwise, it is determined that the hardware of the first FPGA unit 11 has been copied. Thus, the encryption board cannot encrypt the data on the hard disk.

The first USB random number control module 117 communicates with the first encryption module 17. The first FPGA unit 11 further includes an user key control module 114. The user key control module 114 is stored with a list including user keys adopted by the third encryption module 113 to encrypt the data. That is, the list includes a plurality of sets of user keys. When performing the encryption process, different user keys may be selected in accordance with the partitions on the hard disk. Specifically, the user key is selected in accordance with an indicator (T), and an initial value of the indicator (T) is configured in accordance with the random number (Z) generated after the identifier (B) is encrypted.

Figure 5:
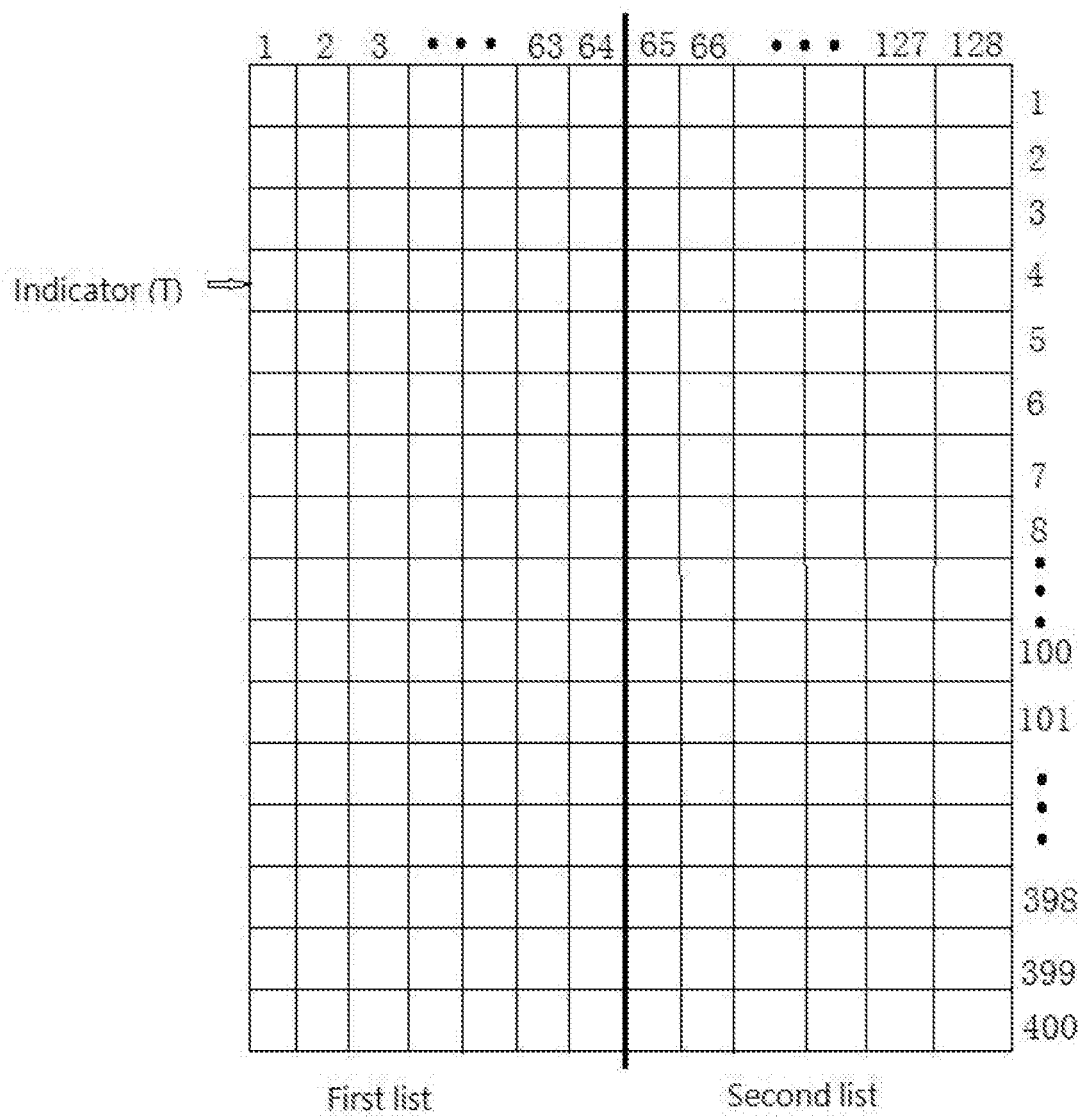
FIG. 5 is a schematic view showing user key lists in accordance with one embodiment.

Referring to FIG. 5, the security locking device of computers includes the electronic key and the encryption board that are hardware matched. The security locking device of computers is configured with one set of user key, and each of the sets includes 400 pairs of user keys. The third encryption module only select N sets of user keys when performing the encryption on the data on the hard disk, wherein N is determined in accordance with a volume of the hard disk. For instance, when one user key corresponds to the volume equaling to 20G, for one hard disk having the volume equaling to M G, the number of user keys N=M/20. The third authentication module selects the corresponding user key in accordance with the location of the partition of the hard disk.

In one embodiment, when the volume of the hard disk is 500 G, the number of the user keys needed is 25. When the third authentication module begins the encryption process, the first address of the user key relates to the initial value of the indicator (T), i.e., the random number (Z). when the space of the first address of the hard disk is full, i.e., 20 G, the value of the indicator (T) is changed. In an example, the indicator (T) may be increased or be decreased by one, and the user key corresponding to the indicator (T+1) or (T−1) is adopted to perform the authentication process.

In order to prevent the encrypted data with the user key from being crack and to ensure that the electronic key and the encryption board can pass the authentication process, the user keys in the key list is divided into two groups according to the high and low bits. R respectively, the user keys include a first list and the second list, wherein the first list is stored in the encryption board, and the second list is stored within the electronic key. Only when the electronic key and the encryption board pass the authentication process and the hardware anti-copy testing process, the encryption board sends the second list to the user key control module. When the first list and the second list combine into one complete key list, the third encryption module may select one user key from the user key control module in accordance with the indicator (T). In an example, the user key is of 128 bits. The first list being stored within the encryption board is the high 64-bit list, and the second list being stored within electronic key is the low 64-bit list. Only when the high 64-bit list and the low 64-bit list from the electronic key are combined into a 400 sets of 128-bit key lists, the data one the hard disk may be encrypted or be decrypted.

In one embodiment, the third encryption module 113 adopts the SM4 algorithm to perform the encryption on the data, wherein the efficiency of the SM4 algorithm is good.

It is to be noted that during the encryption process of the third encryption module 113, only the data transmitted by the hard disk is encrypted, that is, the commands are not encrypted. The third encryption module 113 recognizes the commands and the data in accordance with the frame information structure (FIS) between the SATA host controller and the SATA device.

Figure 6:
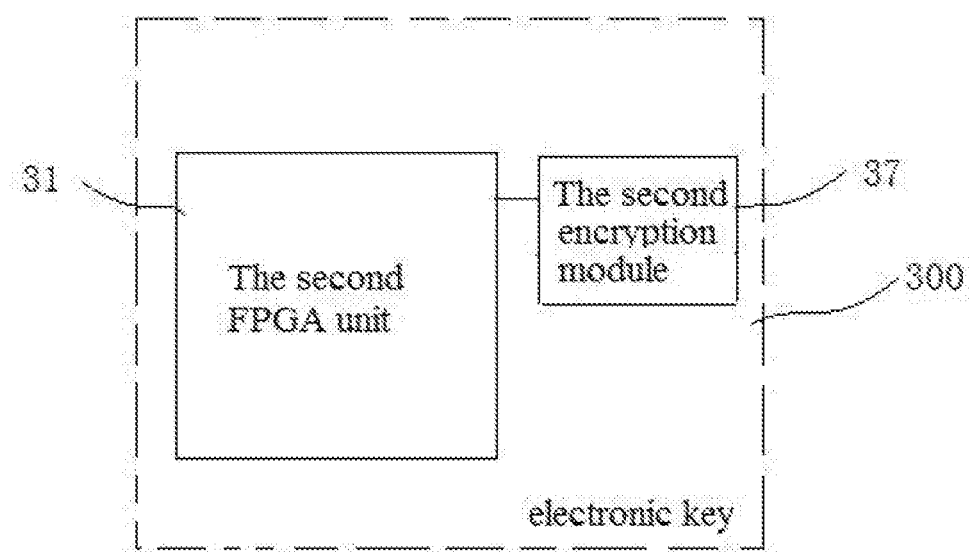
FIG. 6 is a block diagram of the electric key in accordance with one embodiment.

Referring to FIG. 6, the electronic key 300 includes a second FPGA unit 31 and a second encryption module 37.

The second FPGA unit 31 is configured to decrypt the data from the encryption board, to perform the logical operations and to encrypt the second authentication information "B" and to send the encrypted information to the encryption board.

The second encryption module 37 is configured to receive the data from the second FPGA unit 31, to encrypt the data, and to send the encrypted data back to the second FPGA unit 31.

In the embodiment, the data sent from the encryption board to the electronic key 300 is encrypted, and the electronic key 300 needs to decrypt the received data so as to perform logical operations and applications. The second encryption module 37 performs the decryptions to the random number set X continuously sent from the electronic key 300 when the electronic key 300 is inserted into the encryption board, and the random number set X {X1, X2, X3, X4, . . . , Xn} are encrypted by the device key Y. The decrypted random number set X is transmitted to the second FPGA unit 31. The second FPGA unit 31 performs the encryption using another encryption algorithm to the random number set X, and transmits the second authentication information "B" to the encryption board, wherein the random number set X is directed to the SM1 algorithm with respect to the encryption board 100. The electronic key decrypt the received random number set X using the SM1 algorithm, and performs the encryption by the SM4 algorithm.

Figure 7:
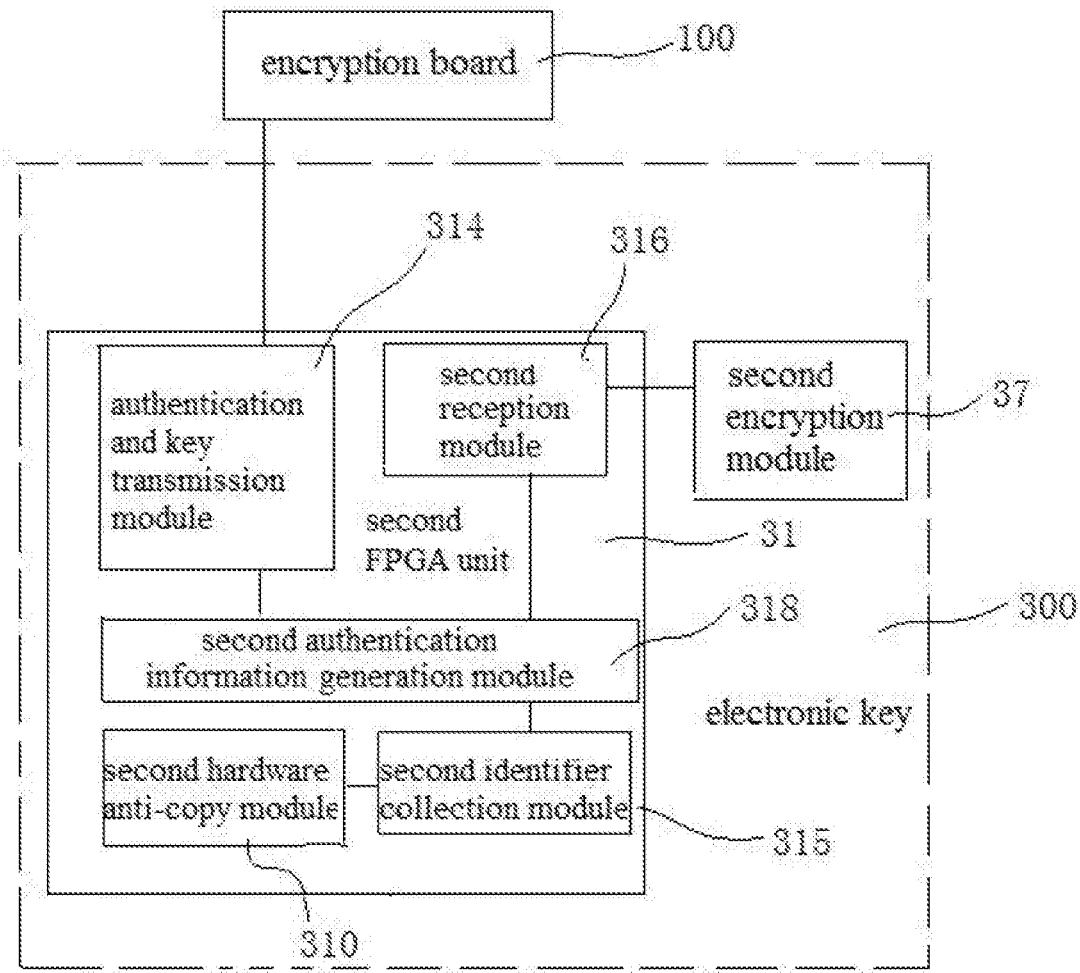
FIG. 7 is a detailed block diagram of the electronic key in accordance with one embodiment.

Referring to FIG. 7, the second FPGA unit 31 includes a second reception module 316, a second authentication information generation module 318, a second identifier collection module 315, a second hardware anti-copy module 310, and an authentication and key transmission module 314.

The second reception module 316 is configured to receive the data sent from the encryption board 100, and to send the data to the second encryption module 37. The data includes the first unique identifier (A) collected by the encryption board and the random number set X.

The second identifier collection module 315 is configured to collect and to transmit the identifier (B) of the electronic key 300, to receive the first unique identifier (A) sent from the encryption board 100, and to determine whether the electronic key 300 and the encryption board 100 are matched. The second identifier collection module 315 combines the first unique identifier (A) and the second unique identifier (B) to be the electronic key identifier (T2).

The second authentication information generation module 318 is configured to generate the second authentication information "B". The authentication and key transmission module 314 is configured to send the second authentication information "B" and the pre-stored list of user keys to the encryption board 100.

In the embodiment, when the second authentication information generation module 318 generates the second authentication information "B", the second authentication information generation module 318 performs the encryption process by the SM4 algorithm on the random number set X, which is decrypted by the SM1 algorithm. Afterward, the encrypted random number set X and the identifier (T2) of the electronic key are logically calculated to obtain the second authentication information "B".

The second hardware anti-copy module 310 is configured to determine whether the hardware of the electronic key 300 has been copied.

In the embodiment, the second hardware anti-copy module 310 determines whether the hardware of the electronic key 300 has been copied in accordance with the same method of determining whether the hardware of the encryption board 100 has been copied by the first hardware anti-copy module. When the electronic key 300 is manufactured, the second hardware anti-copy module 310 is stored with the second pre-stored unique identifier (B1). The unique identifier collected by the second identifier collection module 315 is compared with the second pre-stored unique identifier (B1) to determine whether the hardware of the electronic key 300 has been copied.

The second identifier collection module 315 determines whether the encryption board 100 and the electronic key 300 are paired by determining whether the unique identifier (A1) corresponding to the encryption board 100 of the second identifier collection module 315 and the first unique identifier (A) sent from the encryption board 100.

It is to be noted that, with respect to one pair of computer security lock and key, when the electronic key 300 and the encryption board 100 are manufactured, the first unique identifier (A) and the second unique identifier (B) of the first FPGA unit and the second FPGA unit 31 are different. Also, the unique identifier (A1) and the second pre-stored unique identifier (B1) stored within the first hardware anti-copy module 110 and the second hardware anti-copy module 310 are different. However, the first unique identifier (A) and the unique identifier (A1) are the same, and the second unique identifier (B) and the second pre-stored unique identifier (B1) are the same.

The hardware structure of the electronic key 300 and the encryption board 100, the data encryption process, and the hardware anti-copy process are described. The authentication process of the electronic key 300 and the encryption board 100 will be described hereinafter.

The first FPGA unit generates three random numbers when the first random number and the second random number are inputted. The three random numbers are respectively the random number set X {X1, X2, X3, X4, ..., Xn}, the device key Y, and the random number Z, wherein the random number Z and the device key Y are two generated random numbers when the encryption board 100 is electrified. After the two random numbers are inputted to the first FPGA unit and the second FPGA unit 31, the random number set X is generated. However, if the power supply is terminated or the random number set X is not generated, it is determined that the electronic key 300 is detached from the encryption board 100 or the computer is shut down. Thus, the security locking device of computers stops its operations.

It can be understood that the random number Z relates to the indicator (T) of the user keys for encrypting the data on the hard disk. The random number Z is generated when the power supply is connected, that is, the random number Z remains the same during normal operations.

The random number Z is generated when the electronic key is inserted into the encryption board. However, the random number Z is not latched by the third encryption module 113. Only when the hard disk is formatted, the third encryption module 113 latches the random number Z, and the random number Z is latched within the flash memory. When the encryption board 100 is electrified, the random number Z stored within the flash is loaded into the third encryption module 113. Only when the hard disk is formatted, the third encryption module obtains the new random number Z from the random number calculation module, and the obtained random number Z is updated in the flash.

The random number set X relates to the plaintext adopted during the authentication process between the encryption board 100 and the electronic key 300. Each of the elements of the random number set X is configured to be apart from the adjacent elements. In one embodiment, each of the elements of the random number set X is configured to be apart from the adjacent elements for $\frac{1}{18}$ second. The encryption board 100 and the electronic key 300 performs the authentication process once when one of the element of the random number set X is generated until the authentication process is finished.

To prevent the data between the encryption board 100 and the electronic key 300 from being cracked, the data communicated therebetween are cyphertext. The plaintext is the random number set X, and the cyphertext is the device key Y. The device key Y includes three random numbers, including y1, y2, and y3.

During the authentication process, the device keys adopted in different phases are different. In an example, the random number x1 within the random number set X will be described hereinafter.

1. The device is electrified, and the device key Y is generated:

When the electronic key is inserted into the encryption board, and the computer is power on, the electronic key and the encryption board are electrified. At this moment, the random number calculation module within the first FPGA unit performs the logical operations on the first random number and the second random number to generate the device keys (y1, y2, y3), and transmits the device keys (y1, y2, y3) to the first FPGA unit and the second FPGA unit.

2. The generation of the random number (X1):

Similarly, the random number calculation module performs the logical calculations on the first random number and the second random number to generate the random number (x1). The random number (x1) is substantially the same with the device key (y1, y2, y3), however, the values are different.

3. Determining whether the encryption board and the electronic key are pair:

The first hardware anti-copy module 110 within the encryption board compares the first unique identifier (A) collected by the first identifier collection unit and the unique identifier (A1) stored internally to determine whether the hardware has been copied, and the second hardware anti-copy module 310 within the electronic key compares the second unique identifier (B) collected by the second identifier collection unit and the second pre-stored unique identifier (B1) stored internally to determine whether the hardware has been copied. At the same time, the first identifier collection module 115 compares the second unique identifier (B) sent from the electronic key and the second pre-stored unique identifier (B1) stored within the first identifier collection module 115 to determine whether the encryption board and the electronic key are matched. Similarly, the second identifier collection module compares the first unique identifier (A) sent from the encryption board and the unique identifier (A1) stored within the second identifier collection module to determine whether the encryption board and the electronic key are matched.

Specifically, the first identifier collection module 115 collects the first unique identifier (A) of the first FPGA unit 11, encrypts the first unique identifier (A) with the device key (y1) and the SM4 algorithm, and transmit the encrypted result (ASM4y1) to the electronic key via the USB interface, wherein "A" represents the plaintext, "SM4" represents the encryption algorithm, and "y1" represents the encryption key. The electronic key transmits the ASM4y1 to the second identifier collection module. The second identifier collection module 315 performs the decryption using the SM4 algorithm and the device key y1, and compares the first unique identifier (A) of the decryption result with the unique identifier (A1) internally stored. If the first unique identifier (A) of the decryption result is the same with the unique identifier (A1) internally stored, it is determined that the encryption board and the electronic key are matched.

Similarly, the electronic key encrypts the collected unique identifier (B) with the device key y2 and the SM4 algorithm, and the encryption result (BSM4y2) is transmitted to the first identifier collection module 115 of the encryption board. The first identifier collection module 115 performs the decryption process with the device key y2 and the SM4 algorithm, and compares the second unique identifier (B) of the decryption result with the second pre-stored unique identifier (B1) internally stored to determine whether the encryption board and the electronic key are matched.

When the above two components are determined to be matched, the encryption board and the electronic key are considered as one pair.

4. Real-time authentication process of the electronic key and the encryption board.

The random number calculation module 119 transmits the generated random number (x1) to the first USB random number control module 117, and the first USB random number control module 117 transmits the random number (x1) to the first encryption module 17. The first encryption module 17 encrypts the random number (x1) using the device key y2 and the SM1 algorithm, and transmits the encryption result (x1SM1y1) to the first USB random number control module 117. The first USB random number control module 117 transmits the encryption result (x1SM1y1) to the electronic key, and the electronic key transmits the encryption result (x1SM1y1) to the second encryption module 37. The second encryption module 37 decrypts the encryption result (x1SM1y1) using the device key y2 and the SM1 algorithm to obtain the random number (x1), and the random number (x1) is transmitted to the second authentication information generation module 318. The second authentication information generation module 318 encrypts the random number (x1) using the device key y3 and the SM4 algorithm to obtain the encryption result (x1SM4y3). The second identifier collection module 315 performs the logical operation on the unique identifier (T2) of the electronic key and the encryption result (x1SM4y3) to obtain "T2x1SM4y3," i.e., the second authentication information "B". In addition, the second authentication information "B" is transmitted to the first reception module 116 of the encryption board.

Within the encryption board, the random number modules transmits the random number (x1) to the random number calculation module 119. The random number calculation module 119 encrypts the random number (x1) using the device key y3 and the SM4 algorithm to obtain x1SM4y3. The first identifier collection module 115 transmits the third unique identifier of the encryption board (T1) to the random number calculation module 119, and the random number calculation module 119 performs the logical operations on the third unique identifier of the encryption board (T1) and the x1Sm4y3 to obtain T1x1SM4y3, i.e., the first authentication information "A".

In the embodiment, the logical operation applied to the third unique identifier of the encryption board (T1) and x1SM4y3 is the same with the logical operation applied to the unique identifier (T2) and the x1SM4y3, such as "XOR" operation.

The first FPGA unit 11 compares the first authentication information "A" and the second authentication information "B", or the first FPGA unit 11 decrypts the first authentication information "A" and the second authentication information "B" using the SM4 algorithm and the device key y3 and then the first FPGA unit 11 determines whether the decrypted the first authentication information "A" and the second authentication information "B" are the same. If yes, the electronic key and the encryption board pass the first authentication process.

Upon passing the first authentication process, the random number (x1) is replaced by the random number (x2) and then the above authentication process is continuously conducted, until the power supply is terminated.

The encryption board is the information interface, and the data from or to the hard disk has to pass through the encryption board. The encryption board is also configured with one PCIEx1 interface and one USB female socket. The PCIE interface provides power supply to the computer, and the USB female socket connects to the electronic key to perform the authentication process.

The electronic key operates as the certificate of the security locking device of computers, and the electronic key first receives the information from the encryption board, and then the electronic key generates non-duplicable authentication information, and transmits the authentication information to the encryption board for authentication. After passing the authentication process, the electronic key encrypts the user key list (lower 64 bit×400) stored in the electronic key and sends the ciphertext to the encryption board. As a key component of the computer key, a sub-chip SSX1019, a USB standard port and an FPGA is configured on the electronic key. In addition, a USB port on the electronic key is connected with the encryption board to perform the authentication process.

Figure 8:
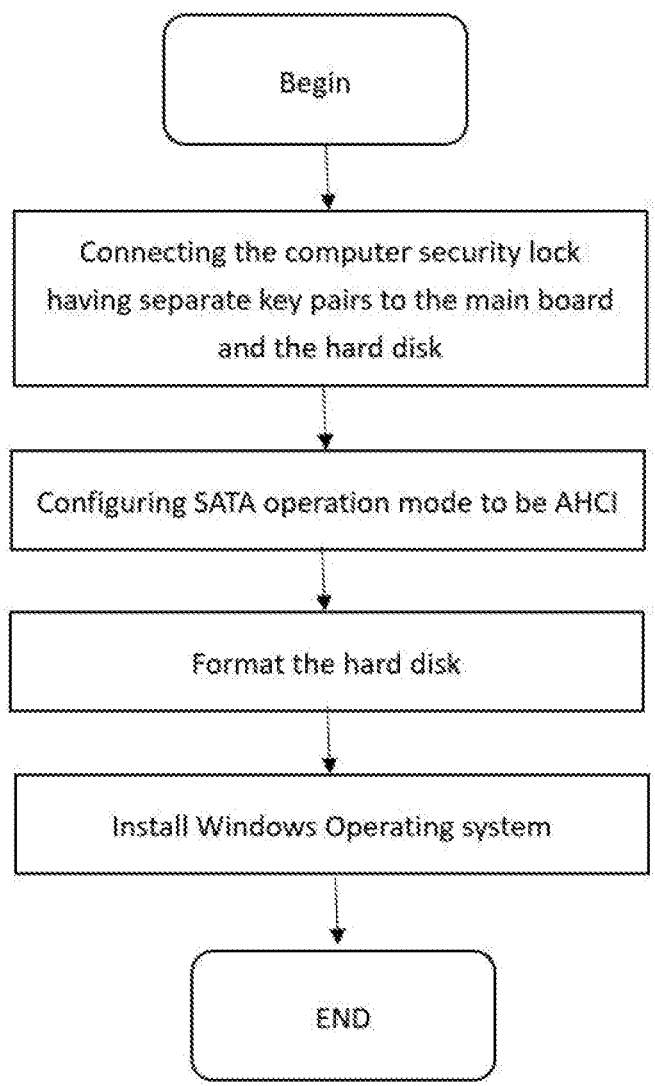
FIG. 8 is a flowchart chart illustrating the loading process of the security locking device of computers in accordance with one embodiment.

As shown in FIG. 8, the loading process of the computer key will be described hereinafter.

① The user inserts the encryption board to the PCIE interface, and the two SATA interfaces respectively connect to the SATA interfaces on the main board and the hard disk. The electronic key is inserted.

② The computer is turned on, and transits into the BIOS configuration, and the SATA operation mode is configured as "AHCI".

③ The hardware mounted under the security locking device of computers is formatted. If the hard disk is mounted for the first time, only a "raw" disk is shown. The "raw" disk may be formatted directly. If the hard disk is re-installed by the user, the partitions have to be deleted in the disk-management configuration, and then the whole hard disk is formatted.

④ The operation system "windows7" is loaded normally.

At this moment, the security locking device of computers is loaded. The user may operate the computer normally if the electronic key is inserted to the computer before the computer is boot.

Figure 9:
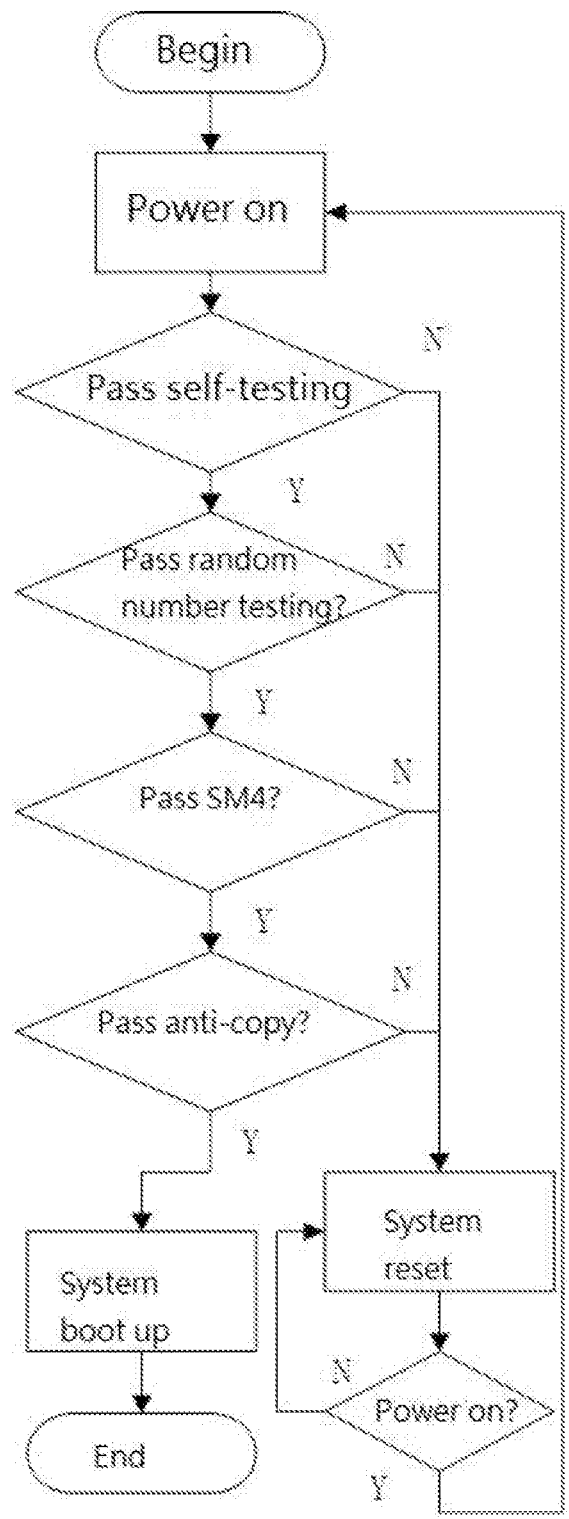
FIG. 9 is a flowchart illustrating the self-testing process of the security locking device of computers in accordance with one embodiment.

FIG. 9 is a flowchart illustrating the self-testing process of the security locking device of computers in accordance with one embodiment.

The computer has to pass through the self-testing process so as to operate normally. The self-testing process relates to the process for the security locking device of computers to test the safety of the random number, the password module, and the hardware.

adopted to perform the encryption. If the cyphertext is correct, it is determined that the calculation modules are normal. Otherwise, the process stops. The SM4 self-testing process includes all of the SM4 algorithms within the encryption board and the electronic key.

④ The FPGA hardware anti-copy detection is activated. The DNA collection module obtains the DNA of the current FPGA from the FPGA and the DNA constant-amount of the FPGA hardware, wherein the constant-amount of the FPGA hardware is embedded within the FPGA. If the DNA is the same with the DNA constant-amount, it is determined that the hardware is safe. Otherwise, it is determined that the hardware has been copied, and the process stops.

The SM4 algorithm within the FPGA may be conducted before the password card is electrified, and it takes 20 seconds to run the SM4 algorithm. The random number testing is also conducted within the FPGA, and it takes within 200 milliseconds.

As shown in Table 1 (see below), the random number testing may be conducted, in addition to the booting up phase, in the manufacturing process or during the computer's operation so as to ensure the safety of the random numbers. In the embodiment, the random number testing of the random number calculation module 119 is shown as below:

TABLE 1

Random number testing statistics

| Item | Sample size | Testing item | Significance level | Repeat times | Warning threshold |
|---|---|---|---|---|---|
| Hardware self-testing | 20*10$^8$ bit | Poker detection | 0.01 | 1 | |
| Factory inspection | Sampling in accordance with the sample size defined in "GM/T 0005-2012 randomness testing specification" | Conducting 15 testing in accordance with GM/T 0005-2012 randomness testing specification | 0.01 | 1 | Determining in accordance with "GM/T 0005-2012 randomness testing specification" |
| Periodical testing | 4*10$^5$ bit | Conducting 12 Testing according to the "randomness detection specification" (except for Fourier detection, linear complex detection, general statistical detection) | 0.01 | Every 5 minutes | |
| Single-time testing | Every 128 bit | Poker detection | 0.01 | Every 55.6 milli-seconds | |

① The self-testing process regarding the chip SSX1019 is executed by the SM1 algorithm. Internally, the key and the plaintext are inputted to perform the ECB encryption. If the obtained cyphertext is correct, it is determined that the calculation modules are normal. Otherwise, the process stops.

② The random number testing is conducted. According to the GM/T 0005-2012 randomness testing specification", after the product is electrified, 20*108 bits of random number are collected and divided into 20 groups within the FPGA. Each of the groups includes 108 bits, a poker detection method is adopted to perform the detection and determination. If the determination is successful, the process continues. Otherwise, the process stops.

③ The SM4 algorithm within the FPGA is activated, the key and the plaintext given by the example A of appendix A of "GM/T 0002-2012 SM4 division password algorithm" are Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A security locking device of computers having separate key pairs, the device comprising:
    an encryption board being arranged between a main board and a hard disk of a computer, and an electronic key being inserted into the encryption board;
    wherein the electronic key is configured to perform a real-time authentication process with the encryption board;

the encryption board is configured to encrypt or decrypt data communicated between the main board and the hard disk, after passing the real-time authentication process;

wherein an user key for encrypting the data between the main board and the hard disk is retrieved from a key list, the key list comprises a first list stored within the encryption board and a second list stored within the electronic key, and the user key is selected from the key list according to a partition of the hard disk where the encrypted data is written to;

during an authentication process, the encryption board collects a first unique identifier relating to a hardware of the encryption board, and the electronic key collects a second unique identifier relating to the hardware of the electronic key; the encryption board receives the second unique identifier from the electronic key, and the second unique identifier and the first unique identifier combined into a third unique identifier of the encryption board; the electronic key receives the first unique identifier from the encryption board, and the first unique identifier from the encryption board and the second unique identifier combined into a fourth unique identifier of the electronic key; and the encryption board continuously generate a random number set X, encrypts the random number set X, encrypts the third unique identifier of the encryption board, and performs logical operations to obtain a first authentication information, the encryption board continuously sends the random number set X to the electronic key, the electronic key encrypts the random number set X, encrypts the fourth unique identifier of the electronic key, performs the logical operations to obtain a second authentication information, and sends the second authentication information to the encryption board, and the second authentication information is compared with the first authentication information to finish the authentication process;

wherein the encryption board comprises:

a first random number module configured to continuously generate at least one first random number;

a second random number module configured to continuously generate at least one second random number;

a first Field Programmable Gate Array (FPGA) unit configured to apply logical operations to internal data, to perform the authentication process to the electronic key, and to encrypt and decrypt the data between the main board and the hard disk;

a first encryption module configured to encrypt the data transmitted from the first FPGA unit and to transmit the encrypted data back to the first FPGA unit;

a single-chip microcontroller communicates with the electronic key;

the first FPGA unit receives a first random number and a second random number, and performs the logical operations on the first random number and the second random number to obtain the random number Z, the random number set X $\{X1, X2, X3, X4, \ldots, Xn\}$, and a device key Y, wherein the random number set X changes along with time, the first FPGA unit transmits the device key Y to the electronic key via the single-chip microcontroller and the USB interface, the device key Y operates as an encryption key when the electronic key and the encryption board encrypt the random number set X, the third unique identifier of the encryption board, and the fourth unique identifier of the electronic key; the data communicated between the encryption board and the electronic key is the encrypted random number set X.

2. The security locking device as claimed in claim 1, wherein after being programmed, the first FPGA unit comprises:

a Serial Advanced Technology Attachment (SATA) host controller communicating with the hard disk;

a SATA device controller communicating with the main board;

a third encryption module configured between the hard disk and the main board for encrypting the data between the hard disk and the main board;

a random number calculation module configured to perform the logical calculations for the first random number and the second random number so as to generate the random set X $\{X1, X2, X3, X4, \ldots, Xn\}$;

a first reception module configured to collect the second authentication information from the electronic key and the second list;

a first identifier collection module configured to collect and to send the first unique identifier of the encryption board and to receive the second unique identifier of the electronic key;

a first authentication information generation module configured to receive the third unique identifier of the encryption board from the first identifier collection module and the random number set X so as to generate the first authentication information for the encryption board;

an authentication module configured to compare the second authentication information and the first authentication information to determine whether the encryption board and the electronic key are matched;

a first hardware anti-copy module configured to store a first pre-stored unique identifier of the encryption board, and wherein the first pre-stored unique identifier is compared with the first unique identifier to determine whether the hardware has been copied;

a first Universal Serial Bus (USB) random number control module configured to communicate with the first encryption module; and a user key control module configured to store the key list;

wherein the SATA host controller, the SATA device controller, the third encryption module the random number calculation module, the first reception module, the first identifier collection module, the first authentication information generation module, the authentication module, the first hardware anti-copy module, the first USB random number control module, and the user the key control module are circuits configured by programming a software within the first FPGA unit; and wherein the SATA host controller and the SATA device controller are electrically connected to the third encryption module, the random number calculation module is electrically connected to the first authentication information generation module and the first USB random number control module, the first reception module is electrically connected to the first USB random number control module, the first identifier collection module is electrically connected to the first hardware anti-copy module and the first authentication information generation module, the authentication module is electrically connected to the first hardware anti-copy module and the first authentication information generation module, the third encryption module is electrically connected to the first hardware anti-copy module through the user key control module, the first USB random number control module is further electrically connected to the first encryption module, the random number calculation module is further electrically connected to the second random number module and the first random number module, and the first reception module is further electrically connected to the single-chip microcontroller.

3. The security locking device as claimed in claim 1, wherein, the user key is selected from the key list according to an indicator, and an initial value of the indicator is the random number Z.

4. The security locking device as claimed in claim 1, wherein the first random number module and the first encryption module adopts a SM1 encryption algorithm, and the second random number module generates the random numbers of 1 bit every hour.

5. The security locking device as claimed in claim 1, wherein the first list stores high bits of the user keys, and the second list stores low bits of the user keys, or the first list stores the low bits of the user keys and the second list stores the high bits of the user keys, the first list and the second list are combined to the complete key list, and the user key selected from the complete key list is adopted to encrypt the data on the hard disk and the main board.

6. The security locking device as claimed in claim 1, wherein SM4 algorithm is adopted to generate the first authentication information and the second authentication information and to encrypt the data on the hard disk.

7. The security locking device as claimed in claim 1, wherein the electronic key comprises:
  a second FPGA unit configured to decrypt the data from the encryption board, perform the logical operations, encrypt the second authentication information, and to send the encrypted information to the encryption board;
  a second encryption module configured to receive the data from the second FPGA unit, encrypt the data, and send the encrypted data back to the second FPGA unit.

8. The security locking device as claimed in claim 7, wherein after being programmed, the second FPGA unit comprises:
  a second reception module configured to receive the data sent from the encryption board, and to send the data to the second encryption module;
  a second authentication information generation module configured to generate the second authentication information;
  a second identifier collection module configured to collect and transmit the second unique identifier of the electronic key;
  a second hardware anti-copy module configured to determine whether a hardware of the electronic key has been copied; and
  an authentication and key transmission module configured to send the second authentication information and the pre-stored key list to the encryption board;
  wherein the second reception module, the second authentication information generation module, the second identifier collection module, the second hardware anti-copy module, and the authentication and key transmission module are circuits configured by programming a software within the second FPGA unit; and
  wherein the second reception module, the authentication and key transmission module, and the second identifier collection module are electrically connected to the second authentication information generation module, the second reception module is further electrically connected to the second encryption module, and the second hardware anti-copy module is electrically connected to the second identifier collection module.

9. The security locking device as claimed in claim 8, wherein the second hardware anti-copy module is further configured to store a second pre-stored unique identifier, and the second pre-stored unique identifier is compared with the second unique identifier to determine whether the hardware of the electronic key has been copied.

\* \* \* \* \*